United States Patent Office 2,705,369
Patented Apr. 5, 1955

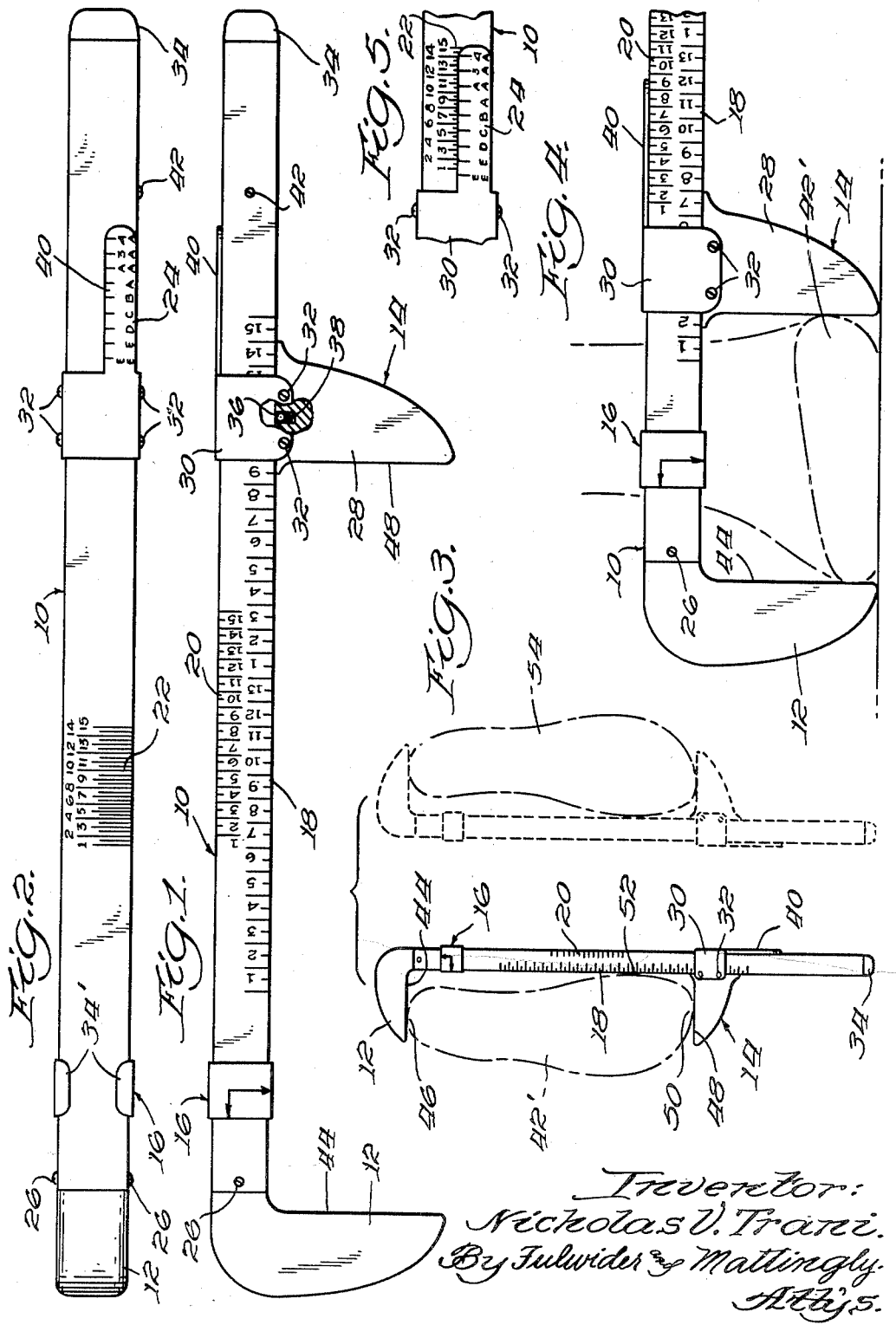

2,705,369

FOOT MEASURING DEVICE

Nicholas V. Trani, Long Beach, Calif.

Application July 16, 1952, Serial No. 299,184

1 Claim. (Cl. 33—3)

The present invention relates generally to the field of footwear, and more particularly to a novel device for measuring a person's foot in order to select the proper size of shoe therefor.

The vast majority of shoes of today are purchased in a ready-to-wear form. These ready-to-wear shoes are sold in standard sizes which are classified both by length and by width. In order to determine the correct size of shoe for a particular foot it is essential that three measurements of such foot be made. These three measurements are first, the heel-to-toe length, second the heel-to-ball length, and third, the width of the foot across the ball. The detrimental results of improperly fitted shoes are well known and unless such three measurements are accurately made the shoes cannot be properly fitted.

There have heretofore been proposed several types of foot measuring devices, the most common being the ordinary wooden size stick, which size stick is undoubtedly the most widely-accepted foot measuring device being utilized today. The ordinary size stick, however, has long been regarded by leading foot specialists and by shoe merchants as a very unsatisfactory foot measuring device. This is primarily held true in view of the fact that these size sticks are so constructed that the foot measurements must be carried out while the prospective shoe buyer is seated, despite the fact that proper foot measurements can only be made while the subject is in a standing position, in which position the feet are required to support the subject's entire weight. Accordingly, where the ordinary size stick is utilized, once the subject's foot measurements have been obtained, the subject must stand up and walk about in the shoes whereby to determine if a proper shoe size has been selected. In consequence, a correct fitting can usually be made only by the unsatisfactory method of "trial and error." This method not only consumes much time, but likewise fails to inspire confidence in the prospective customer regarding the shoe salesman's ability.

Another disadvantage of the ordinary size stick is that its use requires the shoe salesman to carry one or more size numbers in his head while he is conducting the foot measuring operation. This requirement is not only conducive to lost time and effort should the salesman's memory fail, but it also permits errors to occur should the salesman recall a size number other than that actually obtained.

Another form of foot measuring device heretofore proposed has taken the form of a comparatively complex and costly metal assembly which includes a flat plate adapted to receive the subject's foot. This plate mounts sliding elements arranged to be brought into abutment with the foot being measured. In view of the complexity of construction and manner of use of this form of device, it has not come into especially wide acceptance by shoe salesmen.

Several forms of X-ray machines have likewise been suggested for use in the foot measuring process. Generally, however, an X-ray machine merely serves as a check to determine whether or not a proper fitting has been secured by an ordinary size stick. Hence, if a dependable foot measuring device could be utilized in carrying out the foot measuring process it would not be necessary to employ an X-ray machine, the cost of which is considerable.

It is a major object of the present invention to provide a foot measuring device which is simple in construction, yet which is capable of providing accurate foot measurements.

Another object of the present invention is to provide a foot measuring device which may be utilized with equal facility while the subject being fitted is in a standing position or in a sitting position.

It is a further object of the present invention to provide a novel foot measuring device which bears sufficient resemblance to the ordinary measuring stick as to permit shoe salesmen versed in the use of the latter to make an easy transition to the use of such novel device.

Yet another object of the present invention is to provide a foot measuring device which has few working parts and is rugged in construction whereby it may have a long service life.

A further object of the present invention is to provide a foot measuring device which may be fabricated from readily obtainable material and by simple manufacturing processes whereby it may be sold at a comparatively low price.

An additional object of the present invention is to provide a foot measuring device which is extremely simple to use whereby it may be employed by the average shoe salesman with a minimum amount of instruction.

Other objects and advantages of the present invention will become apparent from the following detailed description of a preferred embodiment thereof taken in conjunction with the accompanying drawing wherein:

Figure 1 is a top plan view of a preferred form of foot measuring device embodying the present invention;

Figure 2 is a back view of said preferred form;

Figure 3 is a reduced top view showing the manner in which the foot measuring device of Figures 1 and 2 may be utilized in measuring the length of a foot;

Figure 4 is a front view showing the manner in which said measuring device may be utilized in measuring the width of a foot; and, Figure 5 is a fragmentary view showing the final step in a foot measuring operation utilizing the foot measuring device shown in the preceding figures.

Referring to the drawings, and particularly to Figures 1 and 2 thereof, the preferred form of foot measuring device embodying the present invention may comprise an elongated member 10; a transversely extending backing element 12 formed on one end thereof; a first slider element 14 slidably connected to the elongated member for movement toward and away from backing element 12; and second slider element 16 slidably connected to the elongated member intermediate the backing element 12 and the first slider element 14. The elongated element 10 includes a first scale 18 calibrated to provide heel-to-toe measurements when used in conjunction with the first slider element 14, a second scale 20 calibrated to provide heel-to-ball elements when utilized in conjunction with the second slider element 16, a third scale 22 calibrated in shoe length measurements whereby it may cooperate with a fourth scale 24 formed upon the first slider element 14 to provide the proper shoe width size for a particular shoe length size; the fourth scale 24 being calibrated in shoe width sizes.

More particularly, the elongated member 10 may be formed of a suitable material so as to provide it with rigid characteristics. Preferably, a non-corrosive metal such as aluminum may be used for this purpose. The backing element 12 is shown rigidly affixed to one end of the elongated element 10, as by a pair of screws 26. Conveniently, this backing element may be formed of wood. The first slider element 14 may comprise a generally elongated element 28 which extends forwardly from the elongated member in the same direction as the backing element 12, and which may conveniently be formed of wood. This element 28 is shown slidably connected to the elongated member by means of a generally U-shaped in cross-section mounting clip 30; the element 28 and the clip 30 being secured together as by screws 32. The end of the elongated member opposite the backing element 12 is shown closed by a wooden plug 34.

The second slider element 16 may take the form of a metallic sleeve-like element of generally U-shaped cross-section. Preferably this second slider element will be fabricated from a flexible metal whereby its end pieces 34 may be moved toward or away from one another so as to control the clearance between the inner surfaces of the slider element and the external surfaces of the elongated member. In this manner the resistance against movement of the slider element along the elongated member may be varied.

In order that the first slider element 14 may be freely moved relative to the elongated member and yet will remain in any particular position wherein it may be set, there may be provided a spring-loaded ball 36 shown disposed in a pocket 38 formed in the side of the element 28 proximate to the elongated member.

The fourth scale 24 is shown marked on an elongated ear 40 forming a continuation of the back of the mounting clip 30. A stop screw 42 limits the travel of the mounting clip 30 toward the end of the elongate member remote from the backing element 12.

Referring now to Figures 3 and 4, the first step in carrying out the foot measuring operation is to obtain the length from heel-to-toe of a foot 42', shown in dotted lines in Figure 3. This is accomplished by placing the flat side 44 of the backing element 12 adjacent the rear of the heel 46 of the foot. Thereafter the flat surface 48 of the first slider element 14 is adjusted relative to the elongated member so as to place it in abutment with the toe 50 of the foot. The length of the foot from heel-to-toe may then be read from the scale 18. This measurement per se, however, is not capable of being utilized as the shoe length size. Instead, the length of the foot from the heel 46 to the ball 52 must also be determined. This measurement is found with the foot 42' and the foot measuring device in the same position as indicated in Figure 3, it being necessary to merely manipulate the slider sleeve 16 relative to the elongated member until it is adjacent the ball 52. This reading may be taken from scale 20. Thereafter, the shoe length size must be determined by compromise. In this respect, with a foot perfectly standard in its measurements the heel-to-toe reading on scale 18 will be the same as the heel-to-ball reading on the scale 20. Few people have perfectly normal feet, however, and accordingly such compromise is necessary. If these readings are approximately equal, or if the heel-to-ball measurement is greater than the heel-to-toe measurement the heel-to-ball reading will usually prevail. If, however, the heel-to-toe measurement is less than one full size shorter than the heel-to-ball measurement, a figure between the two measurements should be selected as the shoe length size.

After the proper shoe length size for the foot 42' has been obtained the elongated member may be rotated 180° about its longitudinal axis and the measurements of the other foot 54 taken. This condition is illustrated by the dotted line in Figure 3.

Next, the width of the foot 42' across the ball thereof should be obtained. This is accomplished by disposing the slider element 14 at one side of the ball 52 with the backing element 12 being in abutment with the opposite side of the ball 52. The proper shoe width size may be found by noting which mark on the scale 24 corresponds with the mark on scale 20 denoting the shoe length size which has been previously determined as set forth in the immediately preceding paragraph. This step in the foot measuring operation is depicted in Figure 5. Where, assuming that a shoe length size of nine has been selected, the mark denoting the shoe length size of nine is seen to be in alignment with the mark denoting the proper shoe width size of A. Accordingly, the shoe should have a length of size nine and a width of size A.

It should be particularly noted that in utilizing a device embodying the present invention, the taking of foot measurements with the subject in a standing position is facilitated by the disposition of the scales 18, 20, 22 and 24 upon that surface of the elongated member 10 which is disposed in an upwardly facing horizontal position at the time a reading is made. It should also be noted that when utilizing the foot measuring device of the present invention, the shoe salesman is relieved of making a mental computation by virtue of the automatic coordination of the shoe width size to the shoe length size.

It will be apparent to those skilled in the art that various modifications and changes can be made with regard to the aforedescribed preferred form without departing from the spirit of the invention or the scope of the appended claim.

I claim:

A completely open foot measuring device allowing the measurement of a foot without placement thereunder, comprising: an elongated member of generally square cross section; a backing element rigidly affixed to said member at one end thereof and projecting transversely therefrom to present a foot contacting surface; a slider element having an end abutting said elongated member, a pocket in said end; a ball disposed in said pocket; a coil spring in said pocket beneath said ball, which spring at all times urges said ball outwardly of said pocket; a generally U-shaped in cross section mounting clip affixed to said slider element, which clip and said slider element combine to slidably grasp said elongated member in a position wherein said slider element projects transversely from said elongated member and has a foot contacting surface that is parallel to the foot contacting surface on said backing element and wherein said spring and said ball cooperate to resiliently hold said slider element and said clip to said elongated member whereby said foot contacting surfaces may be slid toward or away from each other; stop means mounted on said elongated member that prevents inadvertent displacement of said slider element from said member; a first scale marked upon the upper surface of said elongated member parallel to the longitudinal axis thereof and calibrated to provide heel-to-toe measurements when used in conjunction with said slider element; a generally U-shaped in cross section slider sleeve having a smooth exterior foot engaging portion, said sleeve encompassing said elongated member intermediately of said backing element and said slider element; a second scale marked upon the upper surface of said elongated member parallel to the longitudinal axis thereof and calibrated to provide heel-to-ball measurements when used in conjunction with said slider sleeve; a third scale marked upon the back of said mounting clip in a direction parallel to the longitudinal axis of said elongated member and calibrated in shoe length sizes; and a fourth scale marked on the back of said elongated member parallel to the longitudinal axis thereof intermediately of said backing element and said slider element, said scale being calibrated in shoe length sizes whereby it may cooperate with said third scale to provide the proper shoe width size for a particular shoe length size, said shoe length size having been predetermined by means of said first and second scales and said elongated element and said slider sleeve, said first two scales being visible when measuring a foot for length and said second two scales being visible when measuring for width.

References Cited in the file of this patent

UNITED STATES PATENTS

| | | |
|---|---|---|
| 1,529,167 | Clausing | Mar. 10, 1925 |
| 1,682,366 | Brannock | Aug. 28, 1928 |
| 1,725,334 | Brannock | Aug. 20, 1929 |
| 2,037,646 | Wheeler | Apr. 14, 1936 |
| 2,593,385 | Digate | Apr. 15, 1952 |

FOREIGN PATENTS

| | | |
|---|---|---|
| 584,958 | Great Britain | Jan. 27, 1947 |